US012544773B2

(12) United States Patent
Lee

(10) Patent No.: US 12,544,773 B2
(45) Date of Patent: Feb. 10, 2026

(54) SEPARATOR INCLUDING MULTI-FLOW DRAIN

(71) Applicant: TESLLON INC., Daegu (KR)

(72) Inventor: Sang Phil Lee, Gyeongsangbuk-do (KR)

(73) Assignee: TESLLON INC., Daegu (KR)

( * ) Notice: Subject to any disclaimer, the term of this patent is extended or adjusted under 35 U.S.C. 154(b) by 0 days.

(21) Appl. No.: 18/714,295

(22) PCT Filed: Nov. 28, 2022

(86) PCT No.: PCT/KR2022/019002
§ 371 (c)(1),
(2) Date: May 29, 2024

(87) PCT Pub. No.: WO2023/101351
PCT Pub. Date: Jun. 8, 2023

(65) Prior Publication Data
US 2025/0018406 A1    Jan. 16, 2025

(30) Foreign Application Priority Data

Nov. 30, 2021   (KR) ........................ 10-2021-0169096

(51) Int. Cl.
*B04C 5/14*   (2006.01)
*B04C 9/00*   (2006.01)

(52) U.S. Cl.
CPC . B04C 5/14 (2013.01); B04C 9/00 (2013.01)

(58) Field of Classification Search
CPC .............. B04C 5/14; B04C 9/00; B04C 11/00
USPC ....................................................... 209/733
See application file for complete search history.

(56) References Cited

U.S. PATENT DOCUMENTS

2017/0087494 A1* 3/2017 Lee ........................ B01D 45/12

FOREIGN PATENT DOCUMENTS

| JP | H06-178908 A | 6/1994 | |
| KR | 20000016318 U * | 8/2000 | ......... B01D 46/4272 |
| KR | 20-0214185 Y1 | 2/2001 | |
| KR | 10-0850002 B1 | 8/2008 | |
| KR | 10-0908883 B1 | 7/2009 | |
| KR | 20-0449289 Y1 | 6/2010 | |

(Continued)

OTHER PUBLICATIONS

Jeon; Heun-soo, "Drain Device of Air Filter" (English Translation), Aug. 25, 2000, worldwide.espacenet.com (Year: 2000).*

(Continued)

*Primary Examiner* — Molly K Devine
(74) *Attorney, Agent, or Firm* — The PL Law Group, PLLC

(57) ABSTRACT

A separator having a multi-flow drain includes a housing having a cylinder-shaped hollow provided therein, an inlet and an outlet formed at an upper portion thereof, and a drain formed at a lower portion thereof, an outer barrel disposed coaxially with the housing inside the housing, and having a smaller diameter than an intermediate member, an inner barrel disposed coaxially with the outer barrel inside the outer barrel, and having a smaller diameter than the outer barrel, a plunger configured to move up and down inside the inner barrel, and a floater configured to be movable up and down in a predetermined range by the plunger, while having a hollow to have buoyancy.

6 Claims, 12 Drawing Sheets

(56) References Cited

FOREIGN PATENT DOCUMENTS

KR         10-1465022 B1    11/2014
KR   10-2019-0028115 A    3/2019

OTHER PUBLICATIONS

Jhun; Hen Su, "Tandem Automatic Drain Device for Compressed Air Filter" (English Translation), Mar. 18, 2019, worldwide.espacenet.com (Year: 2019).*

International Search Report for PCT/KR2022/019002 mailed on Mar. 21, 2023.

* cited by examiner

SEPARATOR INCLUDING MULTI-FLOW DRAIN

CROSS REFERENCE TO RELATED APPLICATIONS AND CLAIM OF PRIORITY

This application claims benefit under 35 U.S.C. 119, 120, 121, or 365 (c), and is a National Stage entry from International Application No. PCT/KR2022/019002, filed Nov. 28, 2022, which claims priority to the benefit of Korean Patent Application No. 10-2021-0169096 filed in the Korean Intellectual Property Office on Nov. 30, 2021, the entire contents of which are incorporated herein by reference.

BACKGROUND

1. Technical Field

The present invention relates to a separator including a multi-flow drain, and more particularly, to a separator including a multi-flow drain capable of continuously performing filtering and discharging moisture even when a flow is continuous and even when a flow is intermittently stopped.

2. Background Art

Compressed air used across all industries, including machinery and electronics, medical care, and food, causes problems, such as deterioration in performance, fixation, and damage, to pneumatic devices due to condensate, particles, and oil. For this reason, moisture removers, oil removers, and particle removers are essentially used for the pneumatic devices.

Here, the pneumatic device may be defined as a device that converts mechanical energy into gas energy using a compressor, a blower, or the like, and appropriately controls the compressed air using a control valve or the like to supply the compressed air to an actuator, thereby outputting mechanical energy suitable for the need of the load. In addition, compressed air is generated by compressing atmospheric air, and the atmosphere is mixed with a lot of pollutants, including moisture and dust. In the process of compressing the atmospheric air using a compressor, the pollutants are also compressed, increasing the level of pollution.

In addition to the components that flow in together with the intake air as described above, lubricant oil and carbide are mixed in the process of compressing the atmospheric air, and the presence of seal materials, along with residues of filter elements, metal powders generated in friction areas, and rust caused by corrosion. Thus, there is a need for a device to clean the compressed air.

Conventional compressed air purifiers, which are commonly called "air filters" in general types and "mist separators" or "demisters" for water removal only, use filter elements each including a fine porous portion to remove moisture contained in compressed air, using the moisture capturing principle in which the compressed air passes through the filter element, and moisture is not allowed to pass through the filter element because it is caught by micropores of the filter element.

The conventional filter element needs to be periodically replaced because the micropores become clogged over time, and the filter element has a smaller cross-sectional area allowing passage of air as the micropores are more clogged, making it difficult for compressed air to pass through the filter element, resulting in an increase in pressure loss.

In order to eliminate the inconvenience of frequent replacement, purification device using a centrifuge (cyclone) has been proposed. As a conventional centrifuge-type compressed air purification device, one described in a patent document (Korean Patent No. 10-1465022, hereinafter referred to as the prior art) has been known.

The prior art is a centrifuge-type compressed air purification device including an exhaust drum installed inside a housing, and spiral grooves formed in an outer circumferential surface of the exhaust drum, wherein contaminants gather on an inner wall of the housing, and cleansed compressed air flows through a central portion of the housing.

Compressed air introduced through a suction pipe, blocked by an obstruction plate, and converted into a rotational state flows to rotate in a circumferential direction around a vent in a preliminary swirl chamber formed inside the housing, thereby undergoing preliminary centrifugation based on the density difference between gases and liquids.

The compressed air that has passed through the preliminary swirl chamber maintains a helical flow in a second swirl chamber, which is formed between an inner surface of the housing and the exhaust drum, along the multiple rows of spiral grooves formed in the cylindrical surface of the exhaust drum, so that the centrifugal force may apply gas-liquid separation based on density difference. Meanwhile, the liquid centrifuged from the compressed air adheres to the inner wall of the housing to be removed later through a circumferential space between the inner wall of the housing and the outer circumferential surfaces of the multiple rows of spiral grooves.

With the helical flow maintained in the second swirl chamber formed between the inner surface of the housing and the exhaust drum, a strong centrifugal force may be applied for gas-liquid separation based on density difference, with the liquid having a higher density separated from the gas having a lower density. Thus, the purified gas passes through the vent formed in the lower portion of the exhaust drum and maintains the helical flow in a third swirl chamber, so that any remaining liquid component is centrifuged once more, and passes along the rotational axis to the exhaust pipe, while the remaining condensate is discharged to the lower portion of the exhaust drum to increase dehumidifying efficiency.

The gas purified by centrifugation passes through the vent and through an outlet nipple connected to the exhaust pipe and external gas piping, to be sent to a pneumatic device. The liquid or condensate separated in the second swirl chamber and the third swirl chamber as described above gathers in a discharge bath within a discharge drum located at the lower portion of the housing, and passes through a final discharge opening and through a trap to be discharged to the outside.

However, the prior art has a problem in that in a state where pressure is continuously supplied from the compressor, foreign substances accumulated in a separated state are discharged to the pneumatic device along an upward airflow, making it difficult to properly manage the cleanliness of the compressed air.

SUMMARY

The present invention has been made to solve the above-mentioned problems, and an object of the present invention is to provide a separator including a multi-flow drain capable of continuously performing filtering and discharging moisture even when a flow is continuous and even when a flow is intermittently stopped.

A separator including a multi-flow drain according to an embodiment of the present invention includes: a housing having a cylinder-shaped hollow provided therein, an inlet and an outlet formed at an upper portion thereof, and a drain formed at a lower portion thereof; an outer barrel disposed coaxially with the housing inside the housing, and having a smaller diameter than an intermediate member; an inner barrel disposed coaxially with the outer barrel inside the outer barrel, and having a smaller diameter than the outer barrel; a plunger configured to move up and down inside the inner barrel; and a floater configured to be movable up and down in a predetermined range by the plunger, while having a hollow to have buoyancy.

A first inducing member and a second inducing member detachable from each other may be disposed between the plunger and the floater.

The separator may further include: a discharge valve having a guide protrusion protruding upward to penetrate the center of the floater; a pressure hole formed through a thickness in a side surface of the discharge valve; and a piston configured to be movable up inside the discharge valve, the piston being moved up by pressure of fluid introduced through the pressure hole.

The separator may further include: a piston spring having one end fixed to the inside of the discharge valve and the other end elastically supporting the piston downward.

The separator may further include: a stopper formed between a lower surface of the plunger and an upper surface of the floater in such a manner as to surround an outer circumferential surface of the plunger and to restrict a height to which the floater is allowed to move up.

The separator may further include: a discharge hole formed through the guide protrusion along a length direction of the guide protrusion; and a valve seat formed on a lower surface of the plunger, and configured to close the discharge hole by tightly adhering to the discharge hole in a selective manner.

The separator may further include: a plunger spring having one end fixed to the inside of the inner barrel and the other end elastically supporting the plunger downward.

A separator including a multi-flow drain according to an embodiment of the present invention as described above is capable of continuously performing filtering and discharging moisture even when a flow is continuous and even when a flow is intermittently stopped.

DETAILED DESCRIPTION

Figure 1:
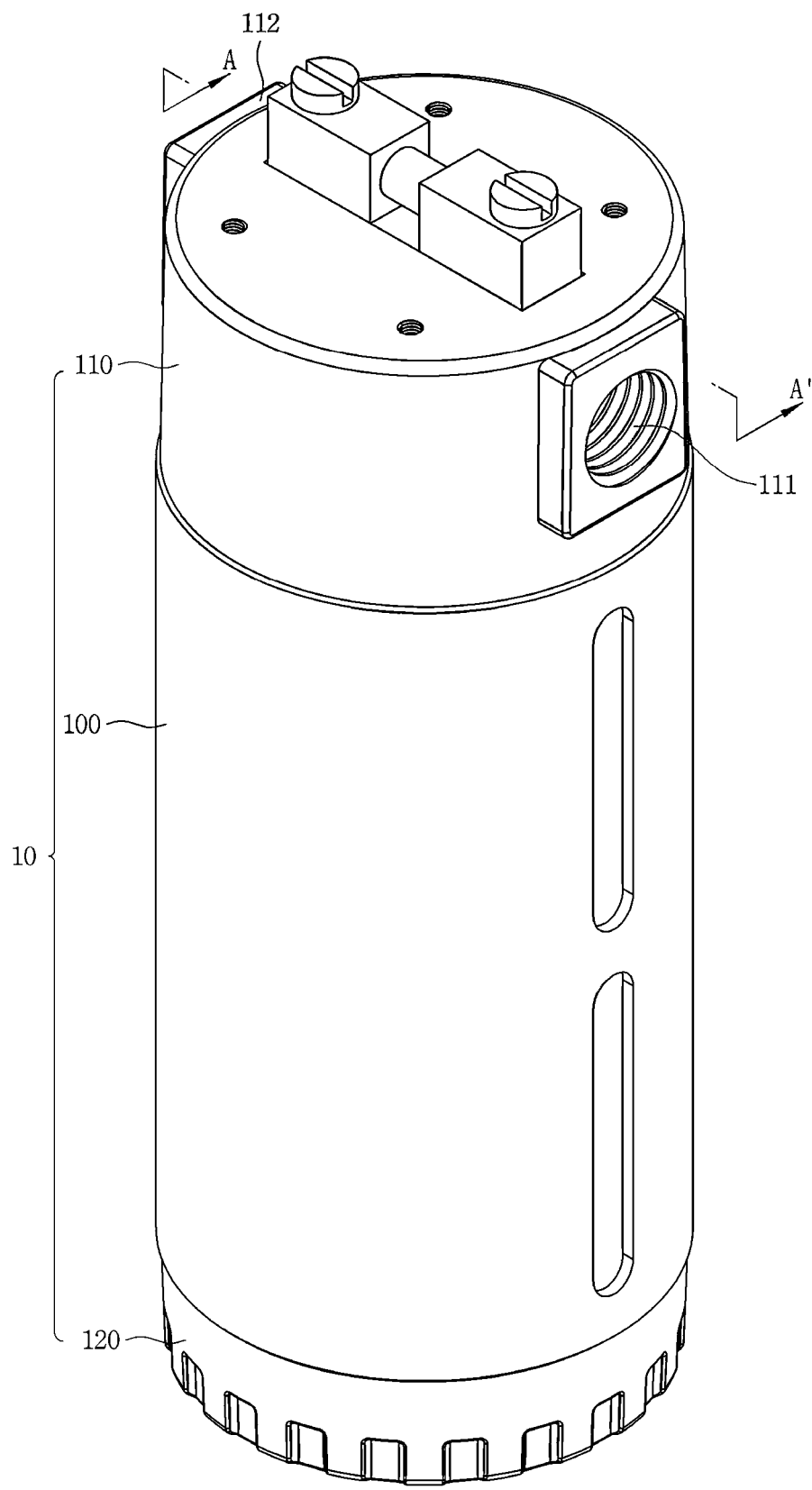
FIG. 1 is a perspective view illustrating a separator including a multi-flow drain according to an embodiment of the present invention.

The advantages and features of the present invention and ways to achieve them will be apparent from the embodiments to be described in detail below in conjunction with the accompanying drawings. However, the present invention is not limited to the embodiments set forth below, but may be implemented in various different forms. The following embodiments are provided only to complete the disclosure of the present invention and to enable those skilled in the art to completely understand the scope of the present invention, and the present invention is defined only by the scope of the appended claims.

The terms used herein are provided to describe the embodiments, and are not intended to limit the present invention. In the specification, the singular forms include plural forms unless particularly mentioned. The term "comprises" and/or "comprising" used herein does not exclude the presence or addition of one or more other elements, in addition to the stated elements. Throughout the specification, the same reference numerals dente the same elements, and "and/or" includes each and every combination of the stated elements. Although "first", "second", and the like are used to describe various elements, the elements are not limited by the terms. These terms are used simply to distinguish one element from another element. Accordingly, it goes without saying that a first element mentioned below may be a second element within the technical spirit of the present invention.

Unless otherwise defined, all terms (including technical and scientific terms) used herein have the same meanings as commonly understood by those skilled in the art to which the present invention pertains. It will be further understood that terms defined in commonly used dictionaries should not be interpreted in an idealized or overly formal sense unless explicitly defined otherwise.

Spatially relative terms, such as "below", "beneath", "lower", "above", and "upper", may be used herein to make it easier to describe the relationship between one element and other elements. It will be understood that the spatially relative terms are intended to encompass different directions of elements in use or in operation in addition to the directions illustrated in the drawings. For example, when an element illustrated in the drawings is reversed, an element described as being provided "below" or "beneath" another element may be placed "above" another component. Accordingly, the exemplary term "below" may include both downward and upward directions. An element may be oriented in a different direction, and accordingly, spatially relative terms may be interpreted depending on orientations.

Hereinafter, embodiments of the present invention will be described in detail with reference to the attached drawings.

Figure 2:
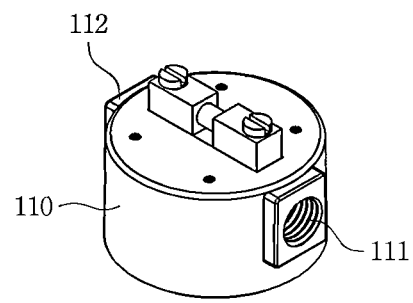
FIGS. 2 and 3 are exploded perspective views each illustrating a separator including a multi-flow drain according to an embodiment of the present invention.
Figure 2:
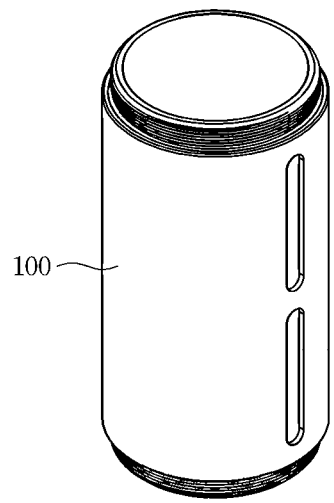
Figure 2:
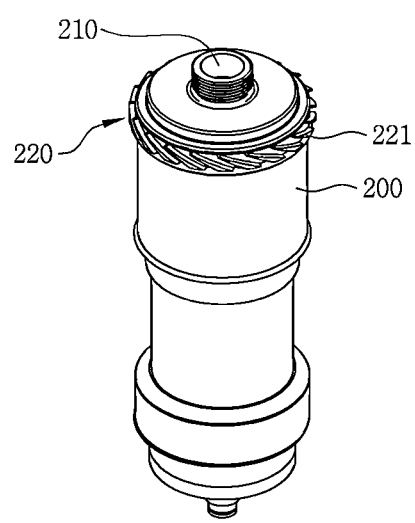
Figure 2:
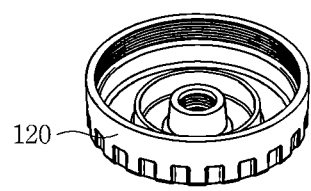
Figure 3:
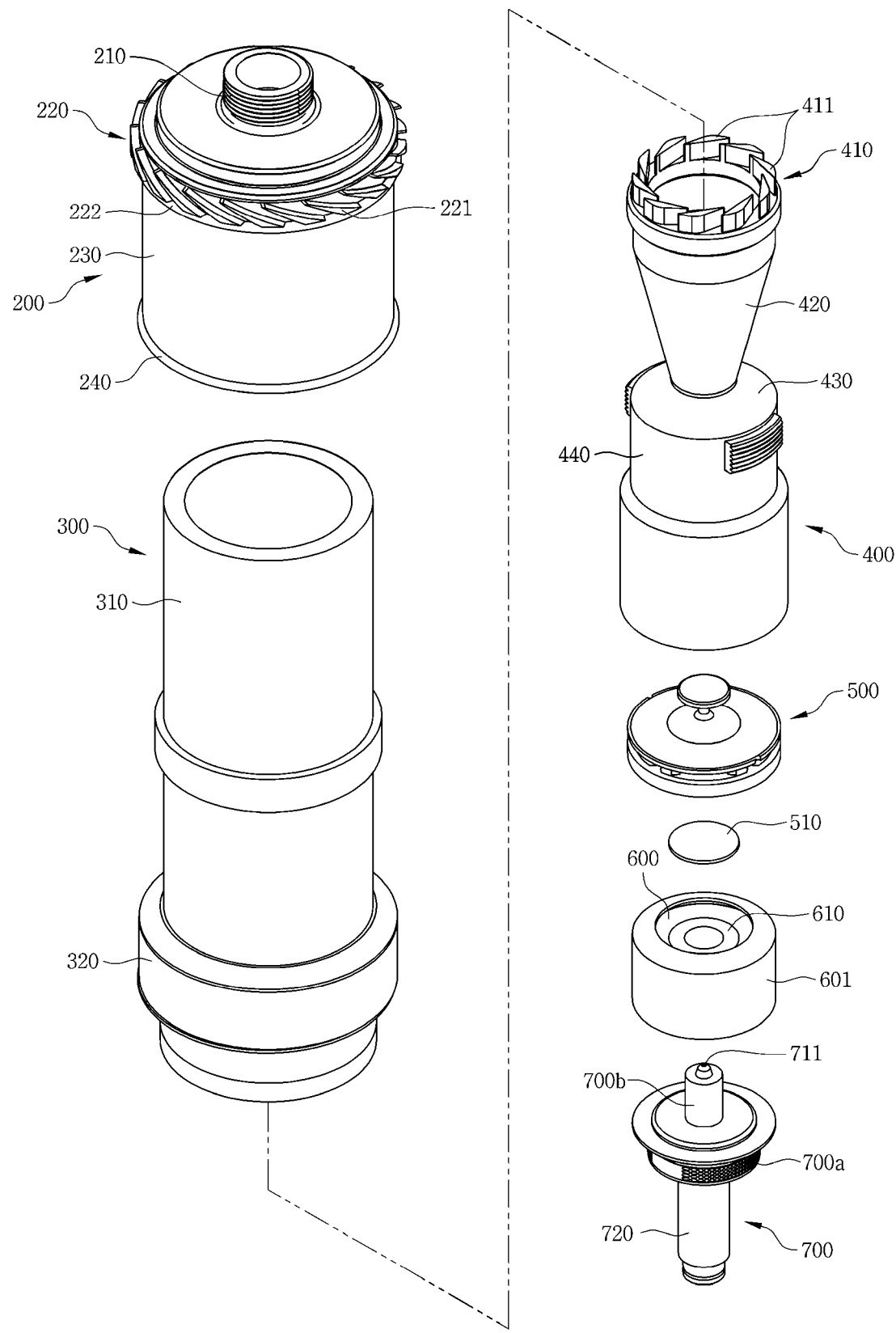
Figure 4:
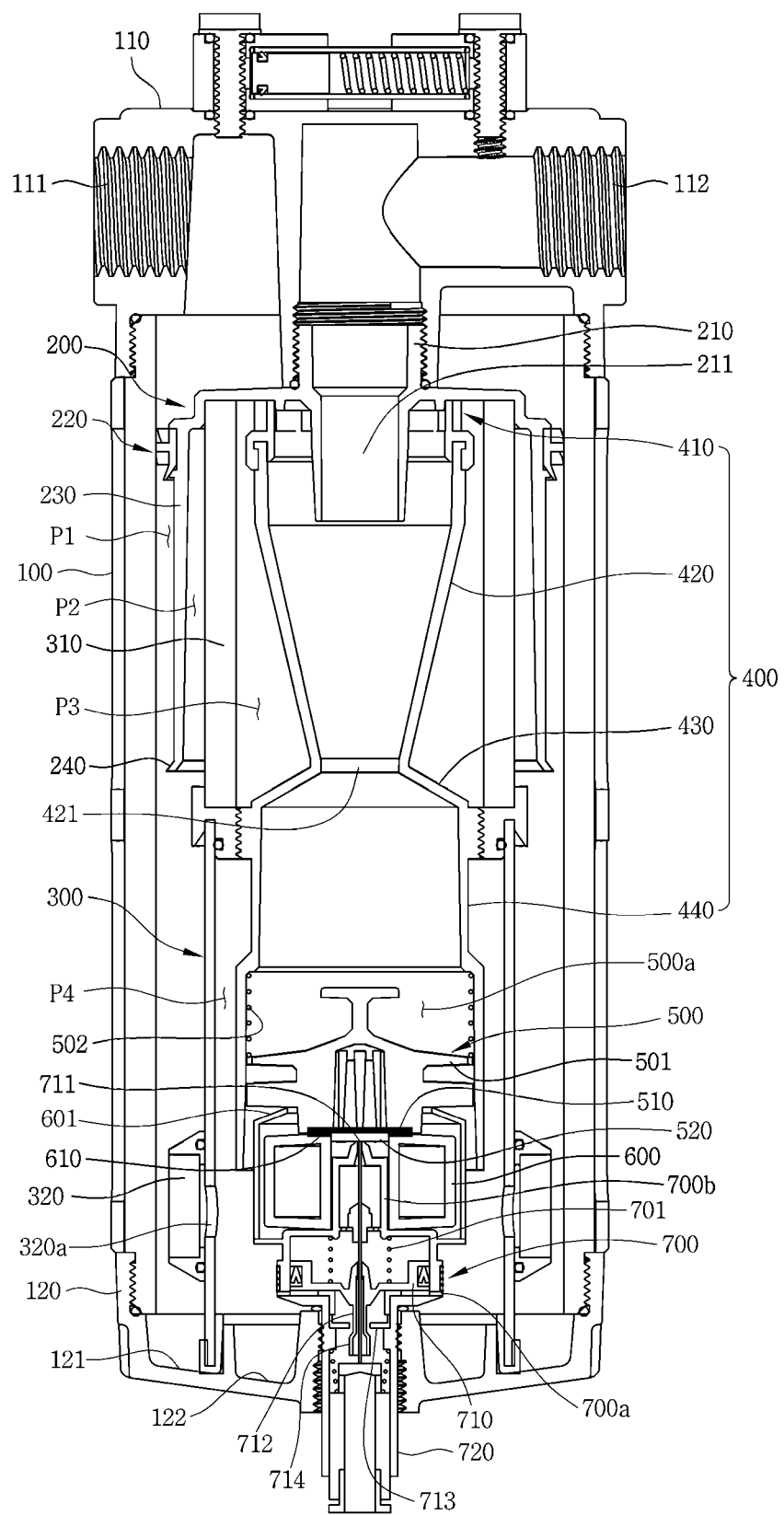
FIG. 4 is a cross-sectional view taken along line A-A' of FIG. 1.
Figure 5:
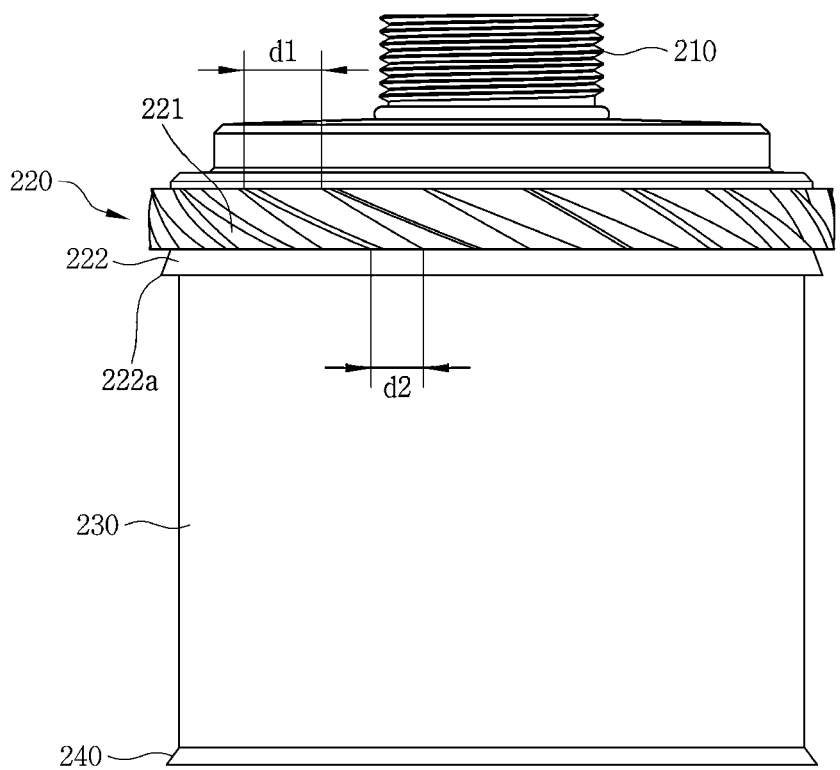
FIG. 5 is a side view of a skirt member applied to a separator including a multi-flow drain according to an embodiment of the present invention.

FIG. 1 is a perspective view illustrating a separator including a multi-flow drain according to an embodiment of the present invention, FIGS. 2 and 3 are exploded perspective views each illustrating a separator including a multi-flow drain according to an embodiment of the present invention, FIG. 4 is a cross-sectional view taken along line A-A' of FIG. 1, and FIG. 5 is a side view of a skirt member applied to a separator including a multi-flow drain according to an embodiment of the present invention.

Referring to FIGS. 1 to 5, a separator including a multi-flow drain according to an embodiment of the present invention may include a housing 10, a skirt member 200, an outer barrel 300, an inner barrel 400, and a flow hole 320a.

The housing 10 may include an intermediate member 100 having a cylinder-shaped hollow provided therein, and an upper member 110 and a lower member 120 formed at both ends in a length direction of the intermediate member 100.

An inlet 111 and an outlet 112 may be formed in the upper member 110, and a drain 720 may be formed in the lower member 120.

The inlet 111 may communicate with a compressing device or a compressor that compresses air, and the outlet 112 may communicate with a pneumatic device that requires supply of air pressure.

The upper member 110 serves as a passage through which clean air is discharged through a purification process after compressed air is introduced, with the inlet 111 through which the compressed air is introduced and the outlet 112 through which the compressed air with foreign substances filtered out is discharged.

The inlet 111 may be formed eccentrically from the axis center of the intermediate member 100 while communicating with a first flow path P1 formed close to an inner wall of the intermediate member 100. That is, a fluid supplied through the inlet 111 forms a primary cyclone along the inner wall of the intermediate member 100. On the other hand, the outlet 112, through which compressed air is finally discharged out of the intermediate member 100, may be formed in such a manner that its inside is located on the central axis of the intermediate member 100.

A discharge pipe 210 communicating with the outlet 112 may be provided on an upper surface of the skirt member 200. The discharge pipe 210 may protrude upward of the skirt member 200, and may have an extension portion 211 formed to protrude inward of the skirt member 200.

In other words, the discharge pipe 210 of the skirt member 200 may be disposed on the central axis of the intermediate member 100 to directly communicate with the outlet 112, and the extension portion 211 extending inward of the skirt member 200 from the discharge pipe 210 may be formed.

The extension portion 211 may be a flow path through which compressed air is finally discharged from the inner barrel 400, as will be described below. Here, it is preferable that an extension length of the extension portion 211 toward the inside of the skirt member 200 is not formed excessively deep inward of the barrel 400 so that foreign substances filtered out from the lower side of the inner barrel 400 are not discharged to the outlet 112 back through rising air flow formed inside the inner barrel 400.

The above-mentioned foreign substances may refer to moisture, oil, etc. contained in compressed air, and air being discharged to the outlet 112 through the extension portion 211 after being separated from the foreign substances by a first filter member 310 and a second filter member 320, which will be described below, may be understood as purification of compressed air.

The skirt member 200 may be formed to have a smaller diameter than the intermediate member 100, so that the first flow path P1 formed along an inner circumferential surface of the intermediate member 100 is provided. That is, air supplied through the inlet 111 flows along the first flow path P1, and the first flow path P1 may refer to a space between an outer circumferential surface of the skirt member 200 and the inner circumferential surface of the intermediate member 100.

A first vortex forming member 220 including a plurality of inclined blades may be formed on the outer circumferential surface of the skirt member 200, the first vortex forming member 220 blocking a fluid flowing toward the first flow path P1 after being introduced through the inlet 111, and inducing cyclone rotation of the fluid flowing toward the first flow path P1.

In other words, a plurality of first blades 221 inclined outward in a radial direction at a predetermined angle are consecutively disposed along a circumference of the outer circumferential surface of the skirt member 200, and the cyclonic rotation of the air is further accelerated along each inclined groove provided between adjacent first blades 221.

In particular, as illustrated in FIG. 5, the first blades 221 may be formed consecutively along a circumference of an upper outer circumferential surface of the skirt member 200. Each of the first blades 221 may be formed in such a manner that a surface thereof facing the inlet 111 is inclined downward, and an upper distance d1 is larger than a lower distance d2 between adjacent first blades 221. That is, each of the first blades 221 may be formed in such a shape that the flow rate of compressed air introduced from the inlet 111 can be instantaneously accelerated.

In addition, each of the first blades 221 is formed in an inclined direction along the length direction of the housing 10 while maintaining the flow direction of the compressed air introduced from the inlet 111, thereby making it possible to accelerate the compressed air while minimizing resistance applied to the compressed air. In other words, each of the first blades 221 is formed in such a manner that an upper surface facing upward thereof is inclined downward, thereby maintaining the flow direction of the compressed air introduced from the inlet 111 to perform an accelerating function while minimizing air resistance.

A diameter-enlarged portion 222 having a diameter that gradually increases may be formed at a lower end of the first vortex forming member 220. At this time, the largest diameter of the diameter-enlarged portion 222 may be smaller than the largest diameter of the first vortex forming member 220.

In addition, a skirt portion 230 extending along a longitudinal direction may be formed at a lower end of the diameter-enlarged portion 222. The skirt portion 230 may be formed to have a diameter smaller than the smallest diameter of the diameter-enlarged portion 222.

The diameter-enlarged portion 222 functions to prevent oil flowing down with a predetermined viscosity while passing through the first vortex forming member 220 from contacting a surface of the skirt portion 230. That is, as the oil flows down on the outer surface of the diameter-enlarged portion 222, if the oil continues to reach a sharp portion 222a of the diameter-enlarged portion 222, and the size of the oil gradually grows and the weight of the oil reaches a predetermined weight, the oil is induced to fall due to its own weight. In other words, the diameter-enlarged portion 222 functions to prevent oil from adhering to the surface of the skirt portion 230.

In addition, a protruding portion 240 protruding outward in the radial direction may be formed at a lower edge of the skirt portion 230. The protruding portion 240 induces oil smeared on the skirt portion 230 and flowing down on the skirt portion 230 to easily fall by virtue of the protruding portion 240.

The outer barrel 300 may have upper and lower openings, and be coupled coaxially with the skirt member 200 inside the skirt member 200 with a smaller diameter than the skirt member 200 to provide a second flow path P2 formed along an inner circumferential surface of the skirt member 200. That is, when the outer barrel 300 is coaxially coupled with the skirt member 200, a space is formed between the inner circumferential surface of the skirt member 200 and an outer circumferential surface of the outer barrel 300, and this space may be defined as the second flow path P2.

A first filter member 310 may be disposed on an upper outer circumferential surface of the outer barrel 300, and a flow hole 320a may be formed in a lower outer circumferential surface of the outer barrel 300. Here, foreign substances can be filtered out by the first filter member 310 disposed in a flow path from the second flow path to a third flow path, and the flow hole 320a may be blocked by the second filter member 320 to filter out foreign substances.

Although it is illustrated in the present embodiment that the first filter member 310 is formed in the entire area on the upper side of the outer barrel 300, the first filter member 310 is not limited thereto, and a plurality of through holes may be formed and a plurality of filter members may be formed in the respective through holes.

In the present embodiment, fine particles scattered in the compressed air introduced through the inlet 111 do not fall along the first flow path P1, but may be filtered out through the first filter member 310 in the process of flowing through the second flow path P2 while being scattered.

The inner barrel 400 may include a first inner barrel 420 and a second inner barrel 440 with a small-diameter portion 421 sectioned with a small diameter along the length direction being interposed therebetween.

The small-diameter portion 421 is required to have an inner diameter of an appropriate dimension, because a larger inner diameter may gradually decrease the flow rate of the fluid formed therein, and a smaller inner diameter may discharge filtered-out foreign substances through the outlet 112 without passing through the small-diameter portion 421 and falling down.

An upper end of the first inner barrel 420 may be coaxially coupled with the outer barrel 300 inside the outer barrel 300 with a smaller diameter than the outer barrel 300 to provide a third flow path P3 formed along a space between an outer circumferential surface of the first inner barrel 420 and an inner circumferential surface of the outer barrel 300. That is, a formed between the outer space circumferential surface of the first inner barrel 420 and an upper inner circumferential surface of the outer barrel 300 may be defined as the third flow path P3.

A second vortex forming member 410 may be formed on the outer circumferential surface of the first inner barrel 420. The second vortex forming member 410 may be formed in a flow path from the third flow path P3 to the first inner barrel 420, which is formed in a space between the outer circumferential surface of the first inner barrel 420 and the first filter member 310, and may include a plurality of second blades 411 inducing secondary cyclone rotation of the fluid introduced from the upper end of the first inner barrel 420. Each of the second blades 411 may have a surface facing outward in the radial direction, and the second blades 411 may be formed consecutively along a circumference while being inclined inward in the radial direction at a predetermined angle.

The second vortex forming member 410 forms and accelerates the secondary cyclone of the fluid passing through the first vortex forming member 220.

The upper opening of the first inner barrel 420 may communicate with the outlet 112, and the first inner barrel 420 may be formed to have a diameter that gradually decreases downward. An inclined portion 430 may be formed to have a diameter that gradually increases downward from a lower end of the first inner barrel 420, and the second inner barrel 440 extending downward from the inclined portion 430 may be located inside the outer barrel 300. Here, a lower end of the second inner barrel 440 may be open, and a space formed between an outer circumferential surface of the second inner barrel 440 and the inner circumferential surface of the outer barrel 300 may be defined as a fourth flow path P4. In addition, a movable space 500a in which a plunger 500 moves up and down may be provided inside the second inner barrel 440, as will be described below.

The plunger 500 may have a contact member 501 tightly adhering to an inner wall surface of the inner barrel 400, and may be disposed to move up and down along the movable space 500a, with a plunger spring 502 of which one end is fixed to the inside of the inner barrel 400 and the other end elastically supports the plunger 500 downward. After the plunger 500 is moved up during a compression process by a rising airflow inside the inner barrel 400, when the rising airflow disappears, the plunger spring 502 provides an elastic restoring force so that the plunger 500 can move down smoothly. Here, a partial portion of an outer circumferential surface of the contact member 501 may be cut out to allow a lower side of the plunger 500 to communicate with the movable space 500a.

In addition, a first inducing member 510 and a second inducing member 610 are installed between a bottom surface of the plunger 500 and an upper end surface of a floater 600 to enable attachment and detachment between the plunger 500 and the floater 600. As an example, in a case where a permanent magnet is installed on the bottom surface of the plunger 500, a magnetic material may be installed on the upper end surface of the floater 600, and in a case where a magnetic material is installed on the bottom surface of the plunger 500, a permanent magnet may be installed on the upper end surface of the floater 600. Here, as a means for enabling detachable coupling between the first inducing member 510 and the second inducing member 610, various attachment/detachment means such as non-woven fabric, adhesive material, electromagnet, and snap-fit coupling may be used, and the coupling means between the first inducing member 510 and the second inducing member 610 is not limited to a coupling means between the permanent magnet and the magnetic material.

The floater 600 may be disposed on a lower side of the plunger 500. The floater 600 may be formed to be hollow to move up due to the buoyancy of filtered water.

The floater 600 may be formed in such a manner as to move up to a restricted maximum height. To this end, a stopper 601 may be formed in such a manner as to surround an outer circumferential surface of the floater 600 in order to restrict an upward movement of the floater 600 above the floater 600, and to block a partial upper portion of the floater 600 in a state where a lower end of the plunger 500 is insertable. Although it is illustrated in the present embodiment that the stopper 601 completely surrounds the outer circumferential surface of the floater 600, the stopper 601 is not limited thereto, and various structures such as a locking protrusion may be adopted as long as the height to which the floater 600 is allowed to move up can be restricted.

In addition, a discharge valve 700 having a guide protrusion 700b may be formed, the guide protrusion 700b protruding upward to linearly guide an upward movement and a downward movement of the floater 600.

The guide protrusion 700b is disposed coaxially on the central axis of the intermediate member 100, and protrudes along the longitudinal direction to function to guide the floater 600 to linearly move up and down along the longitudinal axis.

A discharge hole 711 may be formed in an upper end of the guide protrusion 700b, and a valve seat 520 may be formed at the lower end of the plunger 500 to close the discharge hole 711 by bring the valve seat 520 to tightly adhere to the discharge hole 711 or to open the discharge hole 711 by bring the valve seat 520 to be spaced apart from the discharge hole 711.

That is, when the plunger 500 moves up, the valve seat 520 is spaced apart from the discharge hole 711, so that the valve seat 520 is in an open state, and when the plunger 500 moves down, the valve seat 520 tightly adheres to the discharge hole 711 and closes the discharge hole 711. The discharge hole 711 communicates with a drain 720, which will be described below, so that foreign substances discharged through the discharge hole 711 can be discharged to the outside through a discharge hose (not shown) that is separately fastened to the outside via the drain 720.

The discharge valve 700 may include a piston 710 that moves up and down inside a valve chamber 700c. The piston 710 is configured to move up and down in a sliding manner on an inner wall surface of the discharge valve 700. At this time, the fluid passing through the flow hole 320a pressurizes a lower end surface of the piston 710 to move up the piston 710 while flowing into the discharge valve 700 through a pressure hole 700a formed in an outer circumferential surface of the discharge valve 700. In addition, a piston spring 701 may be provided on an upper surface of the piston 710, with one end being fixed to the inside of the discharge valve 700, and the other end elastically supporting the piston 710 downward.

The piston spring 701 is compressed while the piston 710 is moved up by pressure of the fluid flowing into the pressure hole 710a, and functions to return the piston 710 downward when the pressure of the fluid is not applied through the pressure hole 700a.

A diameter-reduced portion 713 having a reduced diameter may be formed on an inner circumferential surface of the discharge valve 700. A grooved portion 712 and a tightly adhering portion 714 extending downward of the piston 710 by predetermined lengths move up and down inside the diameter-reduced portion 713.

That is, when the grooved portion 712 is located inside the diameter-reduced portion 713, the inside of the discharge valve 700 and the drain 720 communicate with each other, allowing foreign substances to be discharged, and when the tightly adhering portion 714 is located inside the diameter-reduced portion 713 and tightly adheres to the diameter-reduced portion 713, the discharge valve 700 may be closed to prevent foreign substances therein from being discharged into the drain 720.

Meanwhile, the flow hole 320a needs to be designed to have an appropriate size, because a backflow occurs outward in the radial direction from the inner barrel 400 if the diameter of the flow hole 320a is too large, and the plunger 500, which will be described below, does not smoothly move up if the diameter of the flow hole 320a is too small.

The second filter member 320 formed to block the flow hole 320a filters out foreign substances passing through the flow hole 320a. These foreign substances may include fine particles, oil, etc., and foreign substances around the flow hole 320a may be temporarily accommodated in a first accommodating portion 121 and the second accommodating portion 122.

The first accommodating portion 121 and the second accommodating portion 122 may be formed on an inner bottom surface of the lower member 120. The first accommodating portion 121 may be located on an extension line of the first flow path P1, and the second accommodating portion 122 may be located on an extension line of the third flow path P3 and the fourth flow path P4.

Hereinafter, an operating process of a separator including a multi-flow drain according to an embodiment of the present invention will be described with reference to the accompanying drawings.

Figure 6:
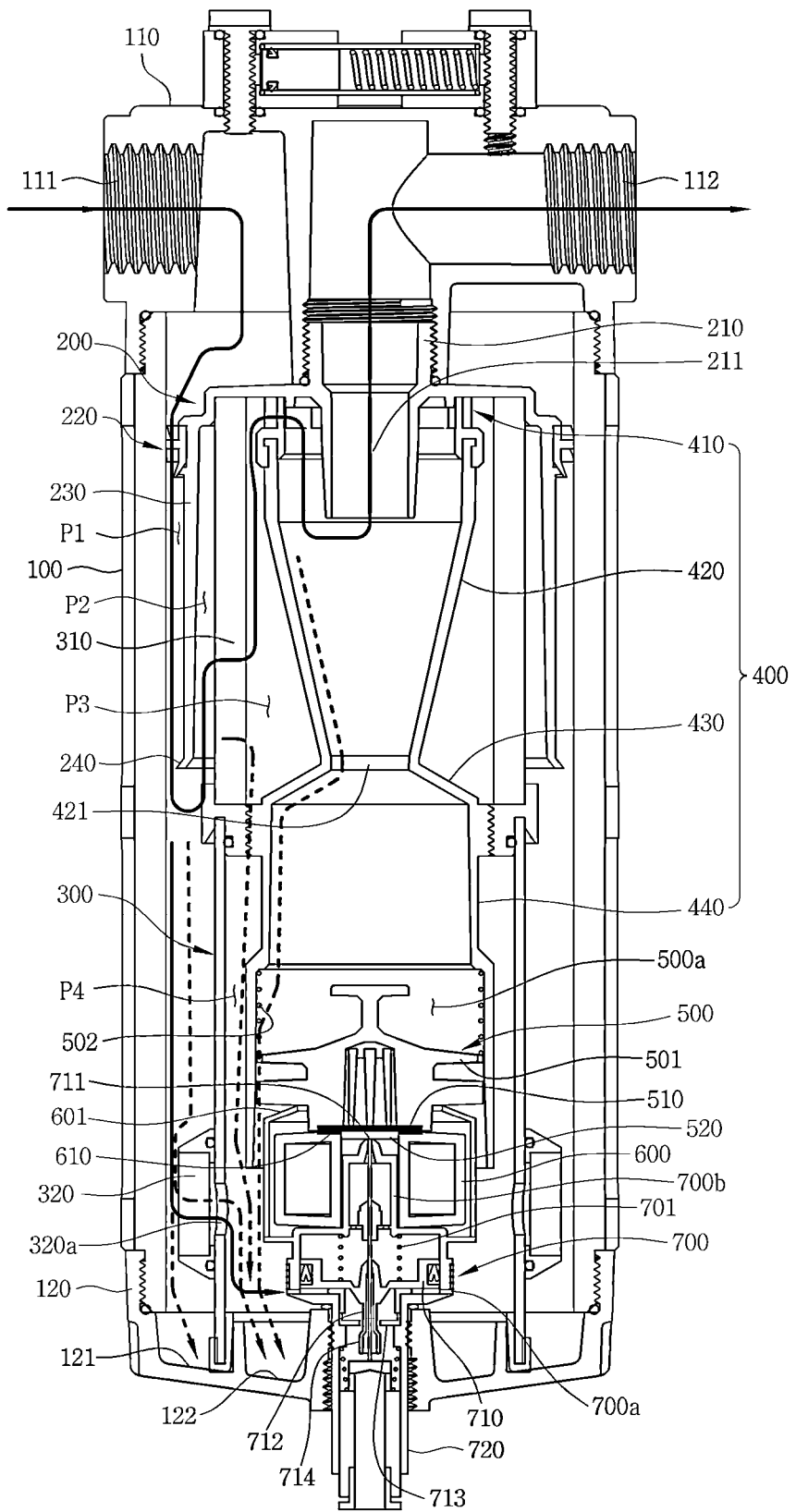
FIG. 6 illustrates paths through which fluids and foreign substances flow inside a separator including a multi-flow drain according to an embodiment of the present invention.

FIG. 6 illustrates paths through which fluids and foreign substances flow inside a separator including a multi-flow drain according to an embodiment of the present invention, and FIGS. 7 to 12 illustrate an operating sequence of a separator including a multi-flow drain according to an embodiment of the present invention.

Figure 7:
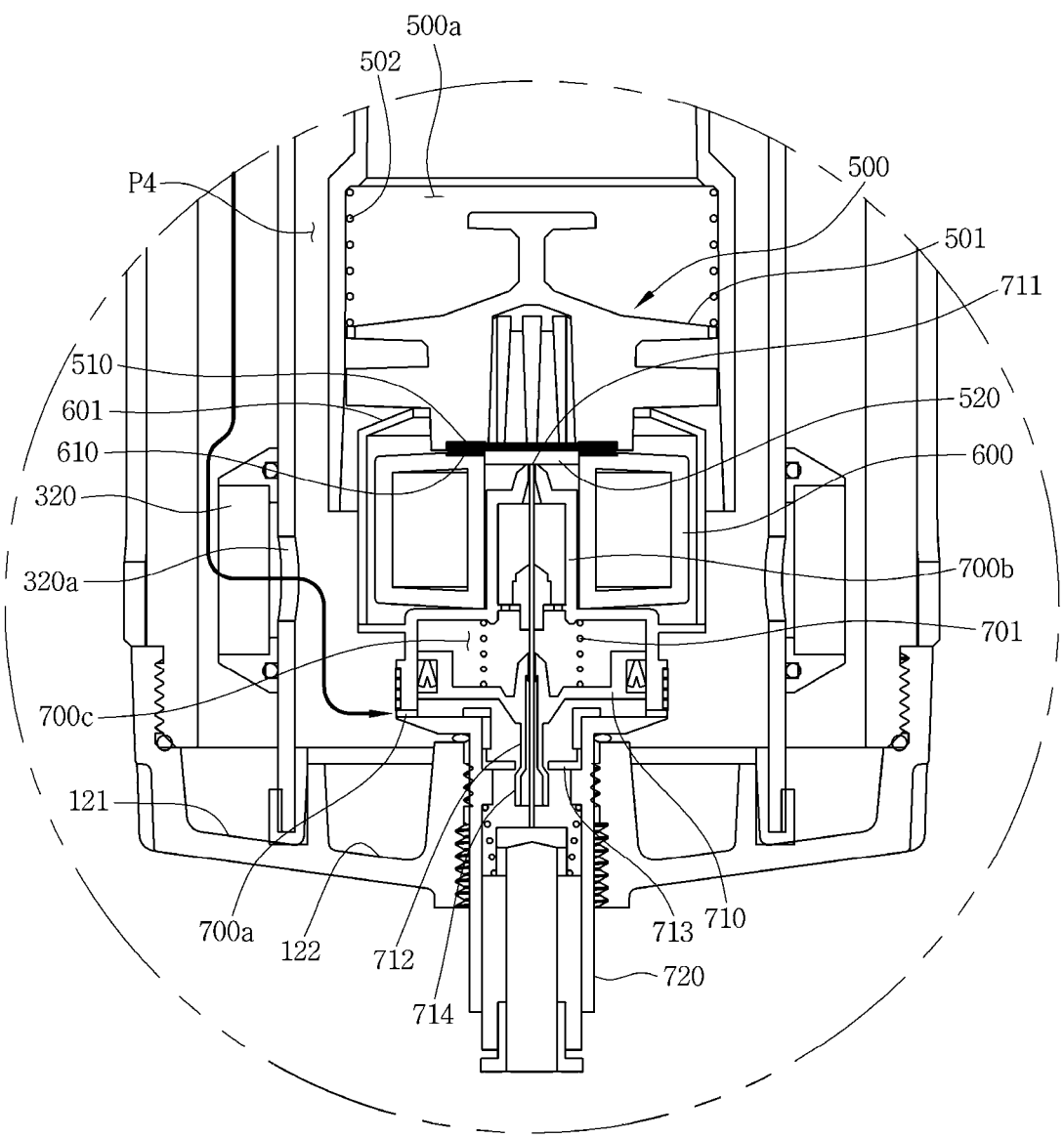
FIGS. 7 to 12 illustrate an operating sequence of a separator a multi-flow drain according to an embodiment of the present invention.

Referring to FIG. 7 together with FIG. 6, compressed air is introduced through the inlet 111, and foreign substances are primarily filtered out by the first filter member 310 while the compressed air flows through the second flow path P2 and the third flow path P3 after passing through the first flow path P1 along a thick solid arrow in FIG. 6. In addition, a hidden line arrow in FIG. 6 indicates a path along which foreign substances move, and fine particles and moisture may fall directly from the first flow path P1 to the first accommodating portion 121.

Figure 8:
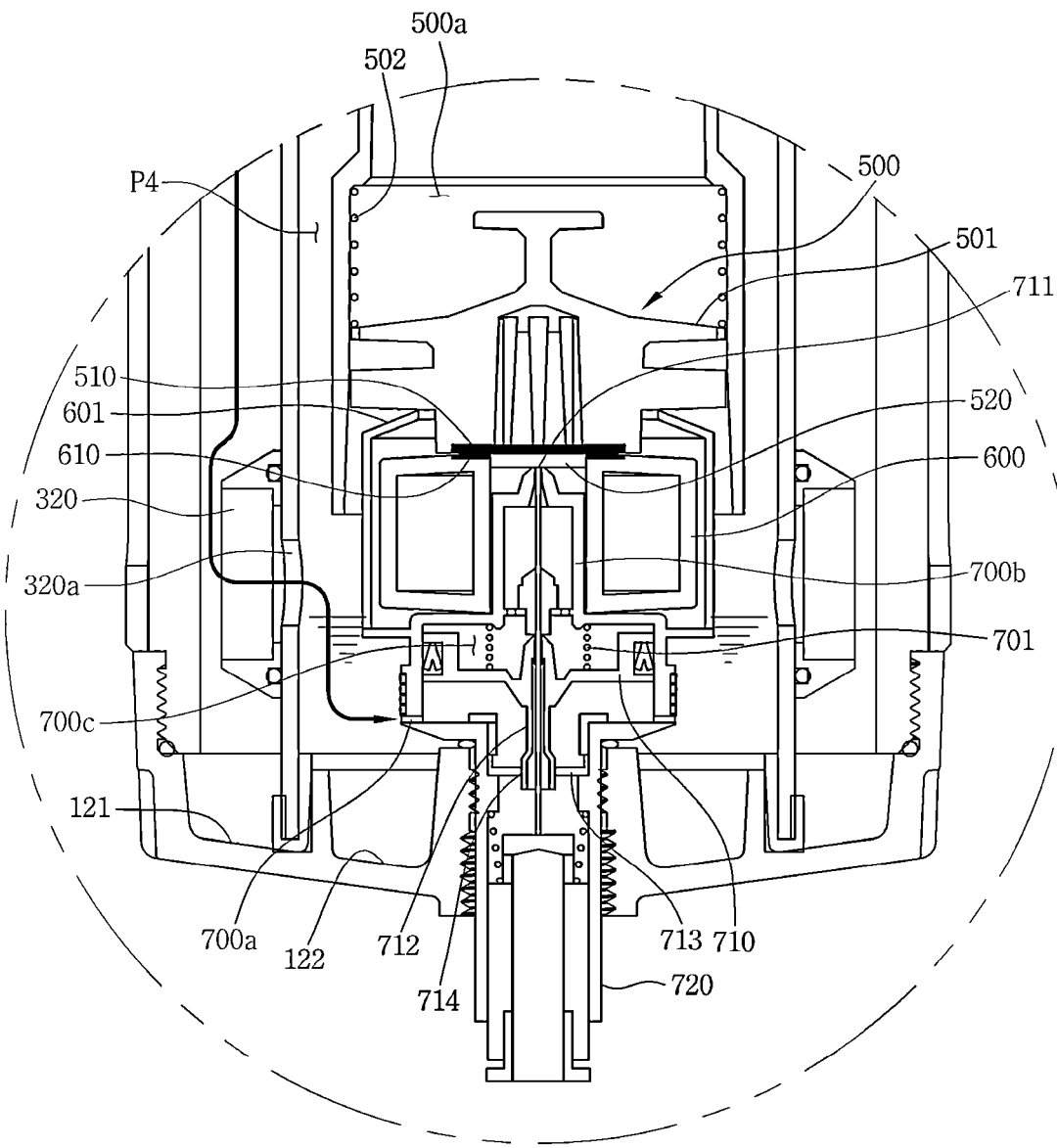

As an upward airflow is formed in the inner barrel 400, the piston 710 is moved up by the pressure of the fluid passing through the pressure hole 710a via the flow hole 320a. At this time, as the piston 710 moves up, the tightly adhering portion 714 tightly adheres to the diameter-reduced portion 713, and at the same time, the discharge hole 711 is closed by the valve seat 520, thereby continuously accumulating moisture as illustrated in FIG. 8.

Figure 9:
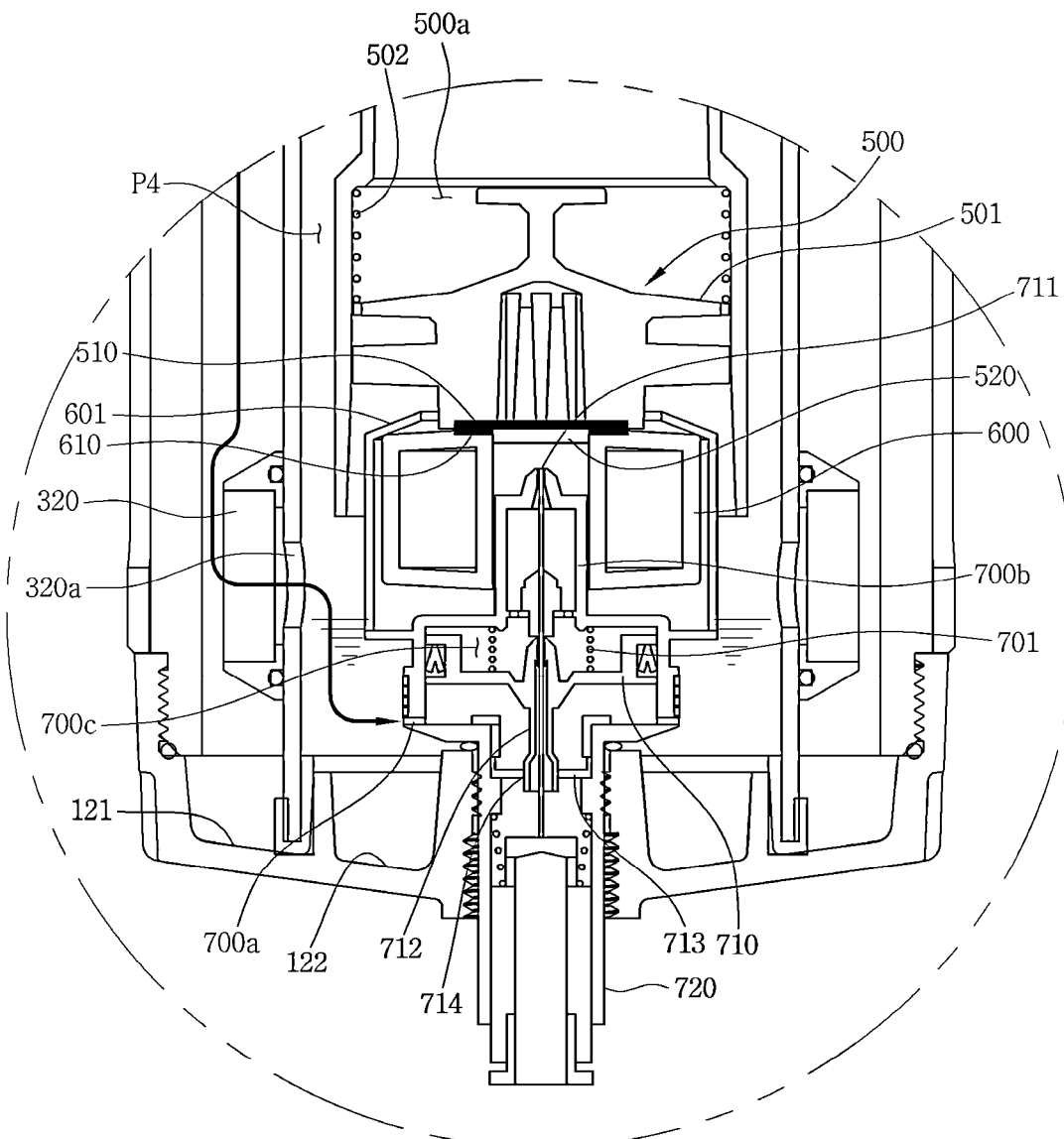

At this time, as illustrated in FIG. 9, the plunger 500 moves up due to an upward airflow in the inner barrel 400 and a force pushing up a lower end of a partial portion of the plunger 500, and accordingly, the floater 600 moves up together due to a coupling force between the first inducing member 510 and the second inducing member 610. In this process, the water level gradually increases due to the moisture being filled as described above.

Figure 10:
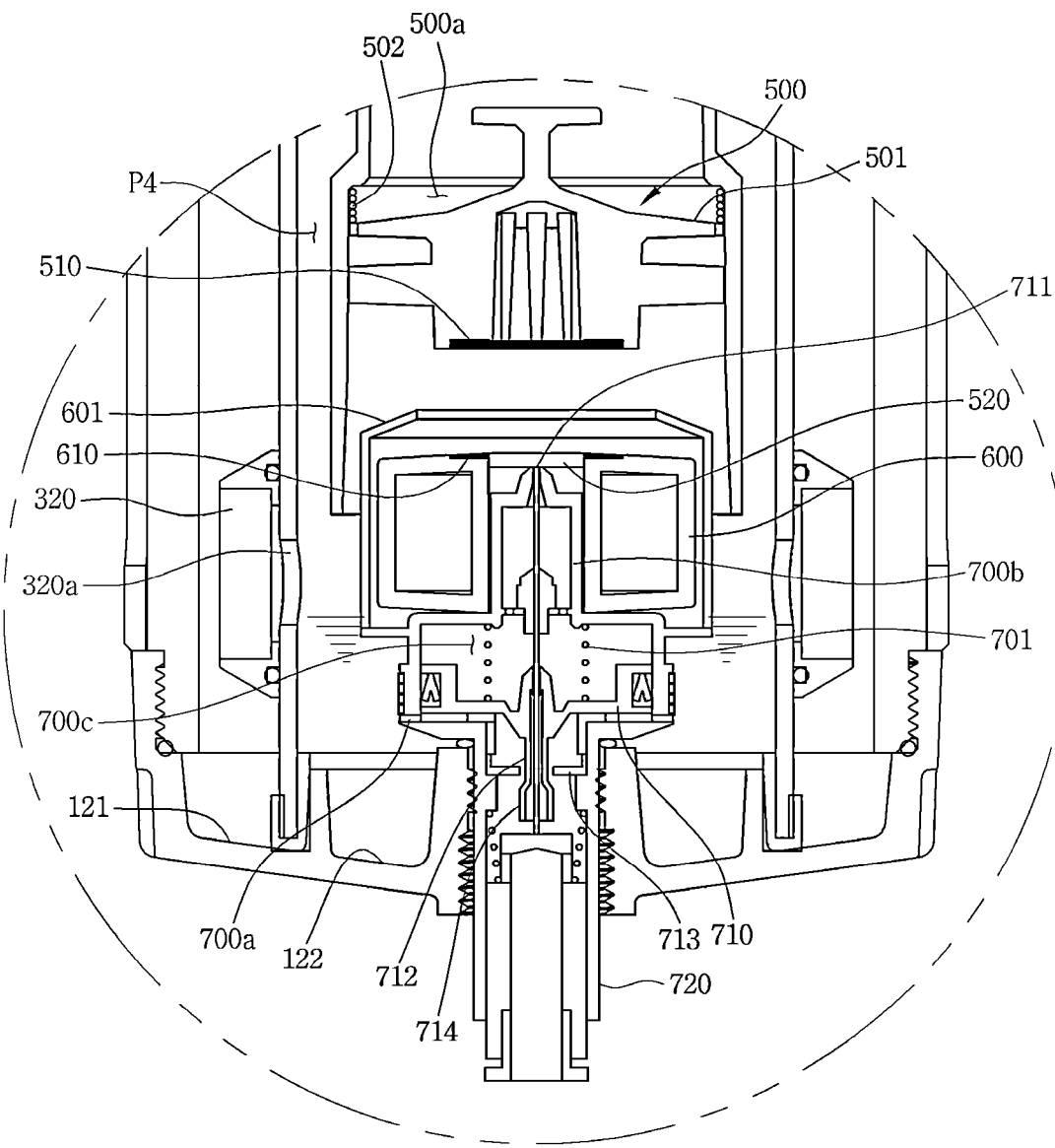

Thereafter, as illustrated in FIG. 10, the upward movement of the floater 600 is restricted by the stopper 601, and as a result, the floater 600 is separated from the plunger 500 and the floater 600 falls.

At this time, because the discharge hole 711 is closed by the valve seat 520, foreign substances contained in the moisture inside the inner barrel 400 remain undischarged. However, as illustrated in FIG. 11, as the water level gradually increases, the floater 600 moves up due to buoyancy.

Figure 11:
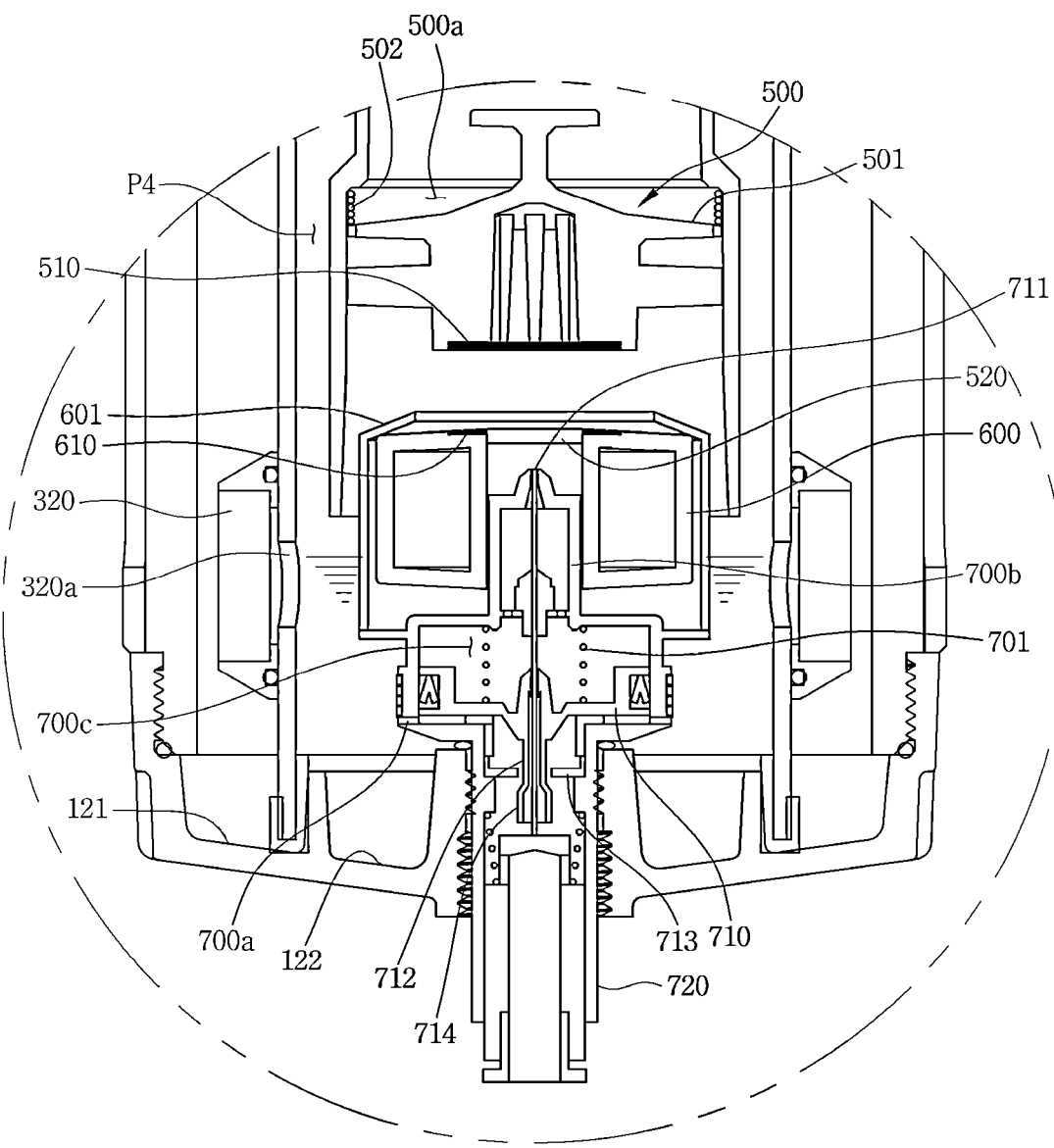
Figure 12:
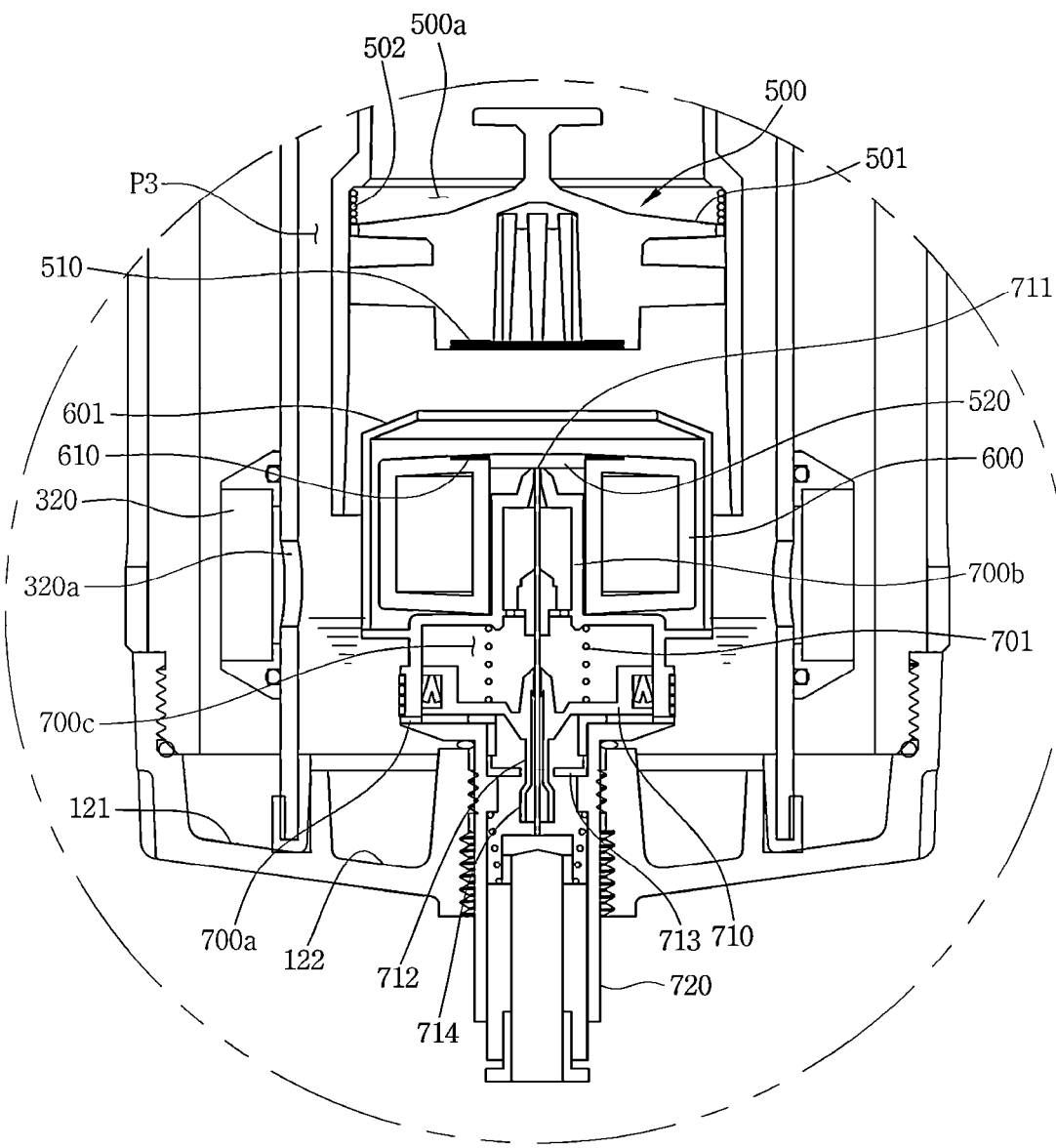

That is, in a process of continuously supplying compressed air through the inlet 111, even if the plunger 500 is kept in a moving-up state due to the upward airflow and the pressure from the lower side, moisture is accumulated in the inner barrel 400, and the accumulation of the moisture causes an increase in water level and an upward movement of the floater 600, thereby opening the discharge hole 711, making it possible to alternately transition between the states of FIGS. 11 and 12 and intermittently discharge the moisture.

Therefore, a separator including a multi-flow drain according to an embodiment of the present invention is capable of continuously performing filtering and discharging moisture even when a flow is continuous or even when a flow is intermittently stopped.

As described above, a separator including a multi-flow drain according to an embodiment of the present invention has been described with reference to the illustrative drawings. However, the present invention is not limited by the above-described embodiment and the drawings, and may be implemented in various ways by those having ordinary knowledge in the art to which the present invention pertains within the scope of the claims.

What is claimed is:

1. A separator including a multi-flow drain, the separator comprising:
   a housing comprising an intermediate member having a cylinder-shaped hollow, and an upper member and a lower member formed at both ends in a length direction of the intermediate member, the upper member having an inlet and an outlet, the lower member having a drain;
   an outer barrel disposed coaxially with the housing inside the housing, and having a smaller diameter than an intermediate member;
   an inner barrel disposed coaxially with the outer barrel inside the outer barrel, and having a smaller diameter than the outer barrel;
   a plunger configured to move up and down inside the inner barrel;
   a floater configured to be movable up and down in a predetermined range by the plunger, while being hollow to have buoyancy;
   a discharge valve having a guide protrusion, a diameter-reduced portion, a grooved portion and an adhering portion, the guide protrusion protruding upward to penetrate a center of the floater, the guide protrusion disposed coaxially on a central axis of the intermediate member, the guide protrusion protruding along a longitudinal direction to function to guide the floater to linearly move up and down along a longitudinal axis, the diameter-reduced portion having a reduced diameter and formed on an inner circumferential surface of the discharge valve, the grooved portion and the adhering portion extending downward of a piston;
   a pressure hole formed through a thickness in a side surface of the discharge valve; and
   the piston configured to be movable up inside the discharge valve, the piston being moved up by pressure of fluid introduced through the pressure hole;
   a first filter member disposed on an upper outer circumferential surface of the outer barrel;
   a flow hole formed in a lower outer circumferential surface of the outer barrel; and
   a second filter member formed to block the flow hole.

2. The separator of claim 1, wherein
   a first inducing member and a second inducing member detachable from each other are disposed between the plunger and the floater.

3. The separator of claim 2, further comprising:
   a stopper formed between a lower surface of the plunger and an upper surface of the floater in such a manner as to surround an outer circumferential surface of the plunger and to restrict a height to which the floater is allowed to move up.

4. The separator of claim 1, further comprising:
   a piston spring having one end fixed to the inside of the discharge valve and the other end elastically supporting the piston downward.

5. The separator of claim 4, further comprising:
   a discharge hole formed through the guide protrusion along a length direction of the guide protrusion; and
   a valve seat formed on a lower surface of the plunger, and configured to close the discharge hole by adhering to the discharge hole in a selective manner.

6. The separator of claim 1, further comprising:
   a plunger spring having one end fixed to the inside of the inner barrel and the other end elastically supporting the plunger downward.

\* \* \* \* \*